United States Patent [19]
Cady et al.

[11] Patent Number: 5,437,348
[45] Date of Patent: Aug. 1, 1995

[54] VEHICLE BONNETS

[75] Inventors: John B. Cady, Hampton in Arden; Mark S. Howard, Whitley; Stephen A. Fisher, Pinner; Robert C. W. Lloyd, Earlsdon; Alan V. Thomas, Shepshed, all of United Kingdom

[73] Assignee: Jaguar Cars Limited, United Kingdom

[21] Appl. No.: 108,481

[22] Filed: Aug. 18, 1993

Related U.S. Application Data

[62] Division of Ser. No. 869,021, Apr. 15, 1992, Pat. No. 5,263,546.

[30] Foreign Application Priority Data

Apr. 16, 1991 [GB] United Kingdom ............... 9108068

[51] Int. Cl.6 ............................................. B62D 25/12
[52] U.S. Cl. ................................. 180/69.21; 180/274; 16/222
[58] Field of Search ................ 180/69.2, 69.21, 274; 16/222

[56] References Cited

U.S. PATENT DOCUMENTS

| | | | |
|---|---|---|---|
| 2,197,648 | 4/1940 | Mersheimer | 180/69.21 |
| 2,668,320 | 2/1954 | Lustig | 180/69.21 |
| 4,294,632 | 2/1981 | Lucchini et al. | 180/69.2 |
| 4,382,312 | 5/1983 | Liggett et al. | 180/69.21 |
| 5,263,546 | 11/1993 | Cady et al. | 180/69.21 |

FOREIGN PATENT DOCUMENTS

| | | | |
|---|---|---|---|
| 2711339 | 9/1978 | Germany | 180/69.2 |
| 0006174 | 6/1982 | Japan | 180/69.2 |
| 0221773 | 6/1982 | Japan | 180/69.21 |

Primary Examiner—David M. Mitchell
Attorney, Agent, or Firm—Davis, Bujold & Streck

[57] ABSTRACT

A vehicle bonnet assembly includes a bonnet hinged to the vehicle body adjacent one edge and having a releasable catch adjacent an opposite edge, the bonnet being hinged to the vehicle body in a manner which will permit rearward movement of the bonnet when an impact is applied to the leading edge thereof, a lifting mechanism being provided to lift the trailing edge of the bonnet in response to rearward movement of the bonnet.

5 Claims, 4 Drawing Sheets

VEHICLE BONNETS

This is a divisional of application Ser. No. 07/869,021 filed Apr. 15, 1992 and now U.S. Pat. No. 5,263,546.

BACKGROUND OF THE INVENTION

The present invention relates to vehicle bonnets and in particular bonnets for motor cars.

In modern motor car design, for visibility, aerodynamic and styling reasons, it is desirable that the bonnet line is kept as low as possible. As a result, there is generally very little clearance between the bonnet and the engine bay contents of the motor car. Consequently, the bonnet will provide very little cushioning effect when impacted by a pedestrian during an accident.

SUMMARY OF THE INVENTION

According to one aspect of the present invention, a vehicle bonnet assembly includes a bonnet, said bonnet being hinged to the vehicle body adjacent one edge and having releasable catch means adjacent the opposite edge, the bonnet being hinged to the vehicle body in a manner which will permit rearward movement of the bonnet when an impact is applied to the leading edge thereof and means to lift the trailing edge of the bonnet in response to rearward movement of the bonnet.

In accordance with the present invention, upon impact with a pedestrian, the vehicle bonnet is lifted to provide a clearance, so that the bonnet may deform to cushion the impact.

According to a preferred embodiment of the invention, the bonnet assembly is arranged to move rearwardly when the impact load is applied to the leading edge, the rearward movement of the bonnet causing the trailing edge of the bonnet to lift. Means is preferably included to prevent rearward movement of the bonnet until the impact load exceeds a predetermined limit, so that the lifting mechanism will not be triggered inadvertently or maliciously.

The invention is now described, by way of example only, with reference to the accompanying drawings, in which:

DESCRIPTION OF THE PREFERRED EMBODIMENTS

Figure 1:
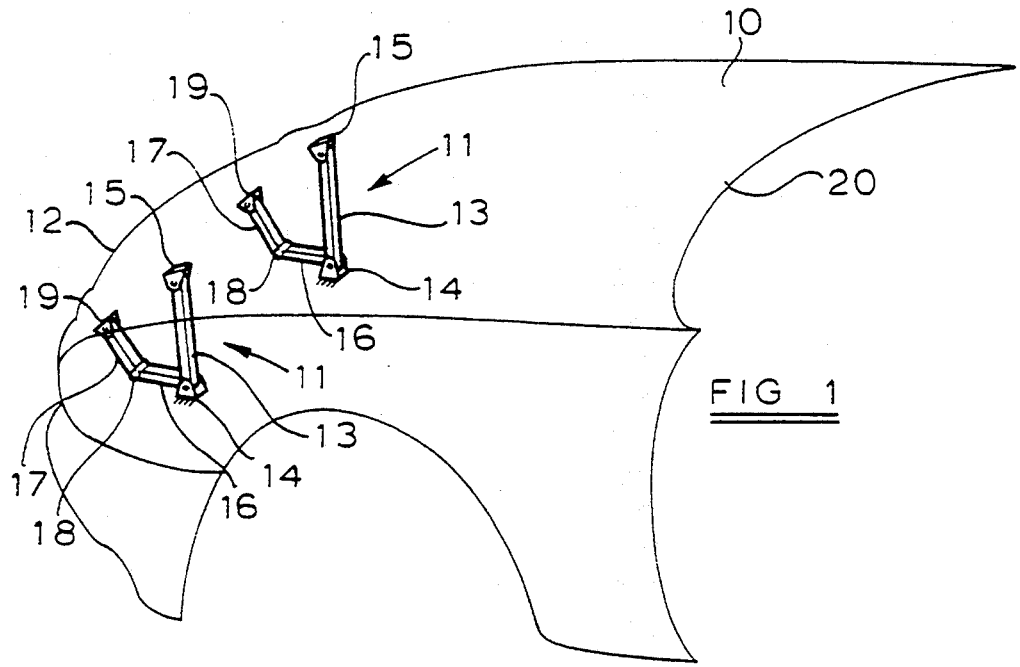
FIG. 1 is a perspective view of a bonnet assembly in accordance with the present invention.
Figure 2:
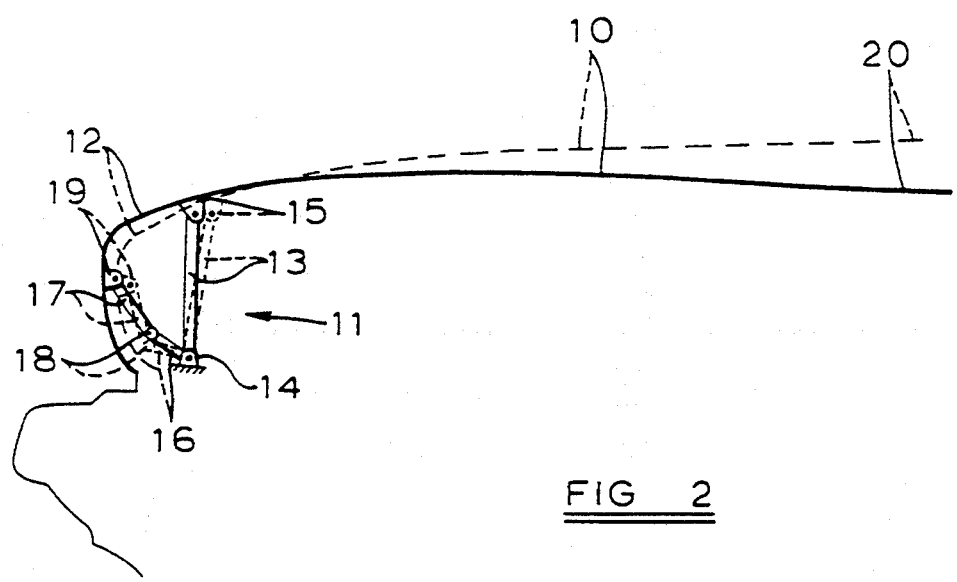
FIG. 2 is a longitudinal cross-sectional view of the bonnet assembly illustrated in FIG. 1.

In the bonnet assembly illustrated in FIGS. 1 and 2, the bonnet 10 is hinged to the vehicle structure by means of a pair of hinge mechanisms 11 which are located adjacent the leading edge 12 of the bonnet 10. Each hinge mechanism 11 comprises a first link 13 mounted at one end to the vehicle structure by means of pivot 14 and at the other end to the bonnet 10 by pivot 15. A second link 16 is attached to the vehicle structure by means of pivot 14. The second link 16 is connected to the third link 17 by means of an energy absorbing structural hinge 18, the third link 17 being attached to the bonnet 10 by means of pivot 19, the pivot 19 being spaced from pivot 15 towards the leading edge 12 of the bonnet 10.

The energy absorbing structural hinge 18 may be a torque loaded frictional joint, a structural failure joint, a shear restraint, any combination thereof or any other structural joint which will permit relative pivoting of links 16 and 17 when loads in excess of a predetermined magnitude are applied thereto.

Spring means may be provided on the pivot 14 in conventional manner, to assist in opening and closing the bonnet 10. Catches (not shown) are provided adjacent the trailing edge 20 of the bonnet 10, to retain the bonnet 10 in the closed position.

Under normal operation, when the bonnet 10 is opened and closed, the links 16 and 17 will remain in fixed relationship and the bonnet 10 will pivot about the pivot 14.

As illustrated in FIG. 2, if the vehicle is in collision with a pedestrian, the impact of the pedestrian on the leading edge 12 of bonnet 10 will cause hinge 18 to give, so that the links 16 and 17 move relative to one another, causing the leading edge 12 of the bonnet 10 to move rearwardly and downwardly as shown in broken line in FIG. 2. The catches adjacent the trailing edge 20 of bonnet 10 are arranged to release the bonnet 10 on rearward movement thereof, so that the trailing edge 20 will be lifted upwardly.

The upward movement of the trailing edge of the bonnet 10 will increase the clearance between the bonnet 10 and the engine thereunder, thus increasing the cushioning effect thereof. Furthermore, the energy absorbing hinge 18 will control rearward movement of the bonnet 10 so that the initial impact on the leading edge 12 of the bonnet 10 is cushioned, thereby reducing injuries to the pedestrian from this initial impact.

Figure 3:
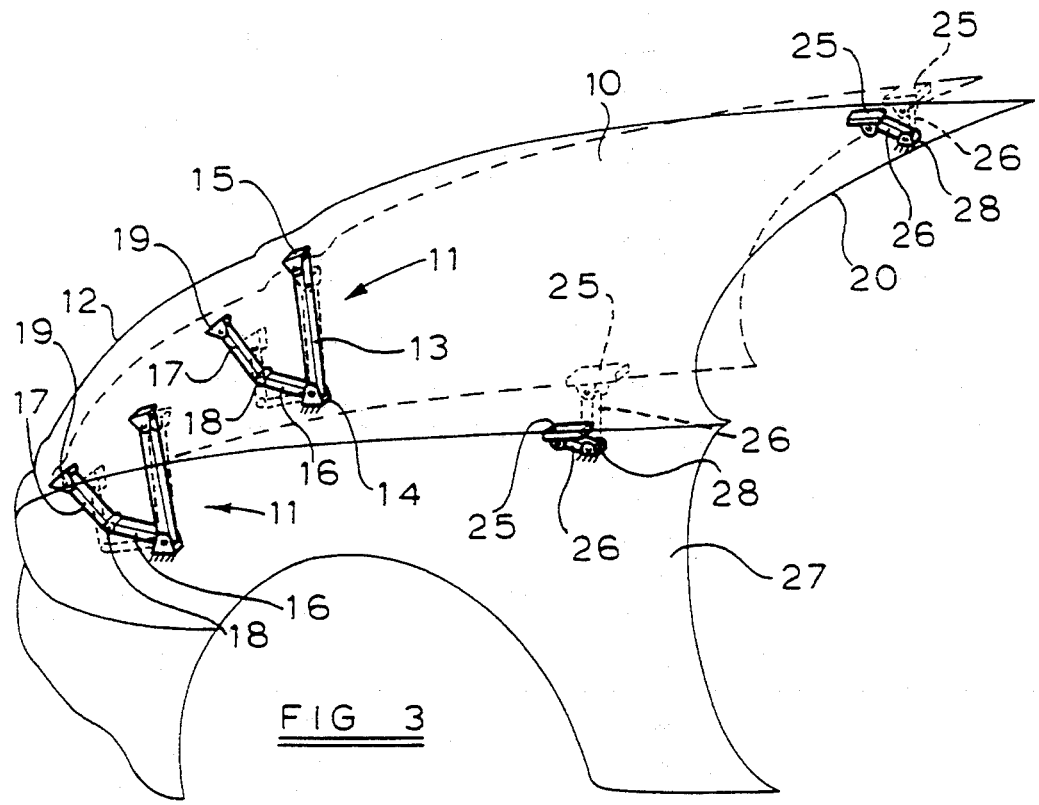
FIG. 3 is a perspective view of a modification to the bonnet assembly illustrated in FIG. 1.

In the modification illustrated in FIG. 3, the catches 25 adjacent the trailing edge 20 of bonnet 10 are mounted on links 26. Each catch 25 is pivotally mounted to one end of a link 26, the other end of the link 26 being connected to the vehicle body 27 by pivot 28. The pivots 28 have torque limiting mechanisms for example, a non-return ratchet, a torque loaded frictional joint, a shear restraint or any combination of the above, so that for normal opening or closing of the bonnet 10, the catches 25 will remain in place as illustrated in full line in FIG. 3. However, upon rearward movement of the bonnet 10 following an impact with a pedestrian, the catches 25 will remain engaged, links 26 pivoting upwardly to control lifting of the trailing edge 20 of bonnet 10, as illustrated in broken line in FIG. 3.

Figure 4:
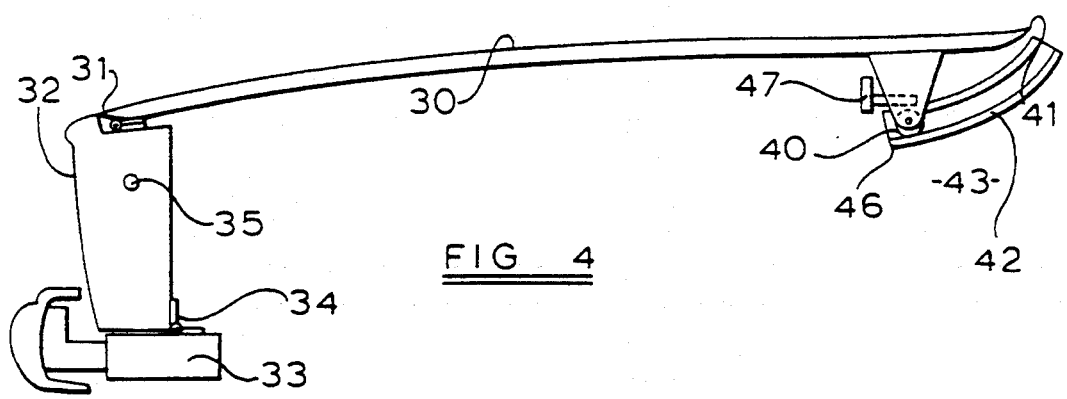
FIG. 4 is a sectional diagram of an alternative form of bonnet assembly in accordance with the present invention.
Figure 5:
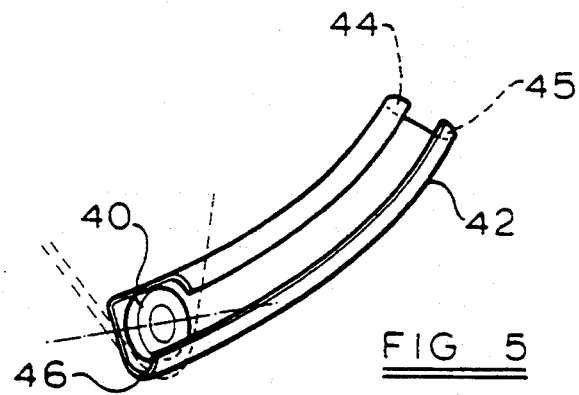
FIG. 5 is a perspective view of a detail of the bonnet assembly illustrated in FIG. 4.

In the embodiment illustrated in FIGS. 4 and 5, the bonnet 30 is hinged at its leading edge 31 to a modular front end assembly 32. The front end assembly 32 is mounted on a front longitudinal cross beam 33 of the vehicle structure, by means of a hinge 34, so that upon collision with a pedestrian, the front end assembly 32 is capable of pivoting rearwardly into the engine compartment. Shear pins 35 are provided to hold the front end assembly 32 in position until the load applied thereto by impact with a pedestrian exceeds a predetermined magnitude. Alternatively, torque limiting means, for example a torque loaded friction joint or structural failure joint may be associated with the hinge 34, for this purpose.

In addition to acting as a platform for the bonnet hinge, the front end assembly 32 may also house the headlamps and cooling pack of the vehicle.

A pair of rollers 40 are mounted one on either side of the bonnet 30 adjacent its trailing edge 41. Tracks 42 are attached to the inside surface of the inner wings 43 for engagement by the rollers 40. The tracks 42 define upper and lower grooves 44 and 45 in which the rollers 40 will locate when they engage the tracks 42. The tracks 42 are curved upwardly from the leading to the trailing end thereof. The upper groove 44 adjacent the leading end 46 of each of the tracks 40 is cut away so that the roller 40 associated therewith, which will normally be located adjacent the leading end 46, may be moved into or out of this portion of the track 42 to permit opening and closing of the bonnet 30. Releasable detent means 47 take the place of the upper groove 44 adjacent the leading end 46 of track 42 so that when the bonnet 30 is in the closed position they will overlie the rollers 40.

If the vehicle is in collision with a pedestrian, impact of the leading edge of bonnet 30 will cause the shear pins 35 to shear, so that the front end assembly 32 will pivot rearwardly about hinge 34, into the engine compartment. The rearward movement of the front end assembly 32 will cause the bonnet 30 to move rearwardly and the rollers 40 will ride up the tracks 42, causing the trailing edge 41 of the bonnet 30 to lift, thus increasing the clearance beneath the bonnet 30 and improving its cushioning effect.

Figure 6:
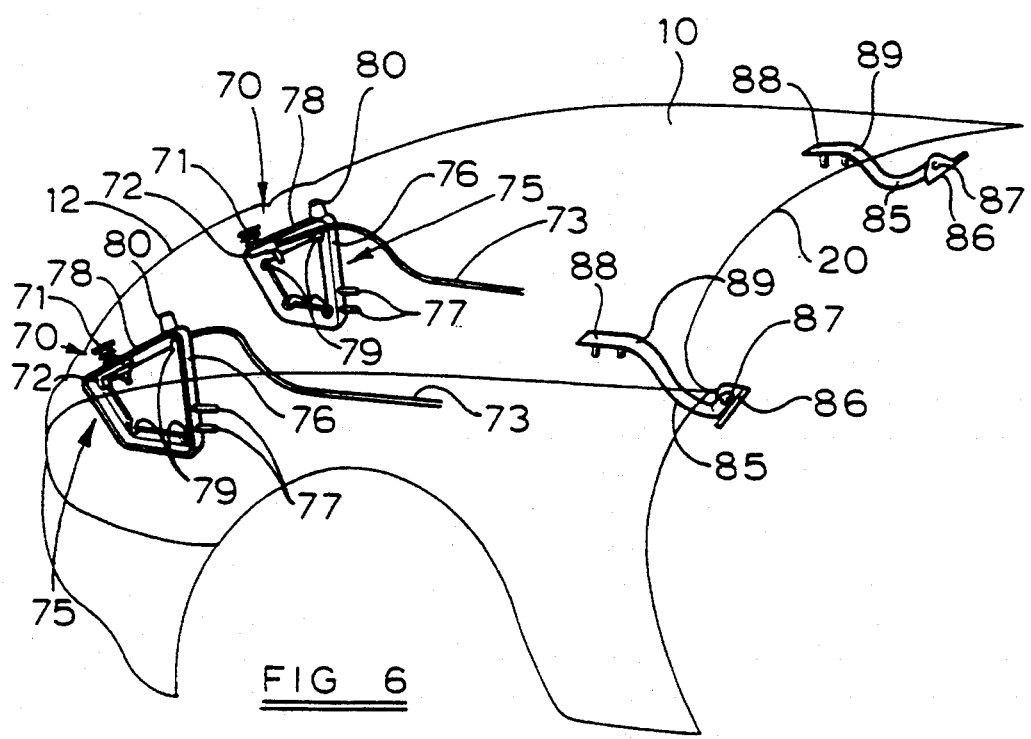
FIG. 6 is a view similar to FIG. 1 of a further alternative form of bonnet assembly in accordance with the present invention.

In the embodiment illustrated in FIG. 6 the bonnet 10 is hinged to the vehicle body, by means of a pair of hinges 85 located adjacent its trailing edge 20. A pair of latch assemblies 70 are provided adjacent the leading edge 12 of the bonnet for releasably fastening the bonnet 10 in its closed position.

The latch assemblies 70 are of conventional construction having members 71 extending from the underside of the bonnet 10 adjacent its leading edge 12 and latching means 72 which will engage and clamp the members 71 when the bonnet 10 is closed. The latching means 72 are controlled by cables 73 to release the members 71 thus permitting the bonnet 10 to be opened.

The latching means 72 are mounted with respect to the vehicle body on quadrilateral frame members 75. Each frame member 75 is mounted longitudinally of the vehicle, an upstanding side 76 of the frame member 75 being secured to the vehicle body by means of bolts 77. Side 78 of frame member 75 extends forwardly and downwardly from the upper end of side 76. The latch means 72 is secured to the forward end of side 78. The frame member 75 is formed from angle section and is locally weakened at the corners by means of notches 79 to provide hinge points so that when an impact is applied to the leading edge 12 of bonnet 10 the frame member 75 will deform, the leading edge of side 78 and the latch means 72 secured thereto moving downwardly and rearwardly. A buffer 80 is provided on the rearward end of side 78 for engagement of the underside of bonnet 10. The buffers 80 serve to cushion and align the bonnet 10 in normal operation and provide a pivot about which the bonnet 10 will rotate when the frame members 75 collapse.

The bonnet 10 is hinged adjacent its trailing edge by means of hinges 85. The hinges 85 are connected to the vehicle body by means of brackets 86 and pins 87. The hinges 85 are of S or swan neck configuration and are made of tubular section. The end 88 of hinges 85 remote from the pins 87 are flattened and are secured to the bonnet 10 in suitable manner. The flattening of the tubular section hinges 85 provides a weakened hinge line 89.

If the vehicle is in collision with a pedestrian, the impact on the leading edge 12 of the bonnet 10 will cause the frame members 75 to collapse so that the latch mechanisms 72 and leading edge 12 of the bonnet 10 which is held with respect thereto by means of members 71 will move downwardly and rearwardly. The rearward part of bonnet 10 will thus pivot upwardly about buffers 80 and rearward movement of the bonnet 10 will cause the hinges 85 to bend along hinge lines 89, causing the trailing edge 20 of the bonnet 10 to lift. Clearance beneath the bonnet 10 is consequently increased in similar manner to the embodiments described previously.

It will be appreciated that the latch mechanisms 72 may be secured to the vehicle body in any manner which will cause the latch mechanism 72 to move rearwardly in response to an impact. For example, the frame members 75 may alternatively be attached to the vehicle body adjacent their leading side and the latch means 72 attached to the upper side of the frame member 75 adjacent its trailing edge, so that upon impact the latch means 72 will move downward and rearwardly. Instead of being formed from angle section, frame member 75 may be formed from tubular section, the tubular section being flattened at the corners to provide pivot points. Alternatively, the frame may be formed from separate wall sections interconnected by torque loaded frictional pivot joints.

Figure 7:
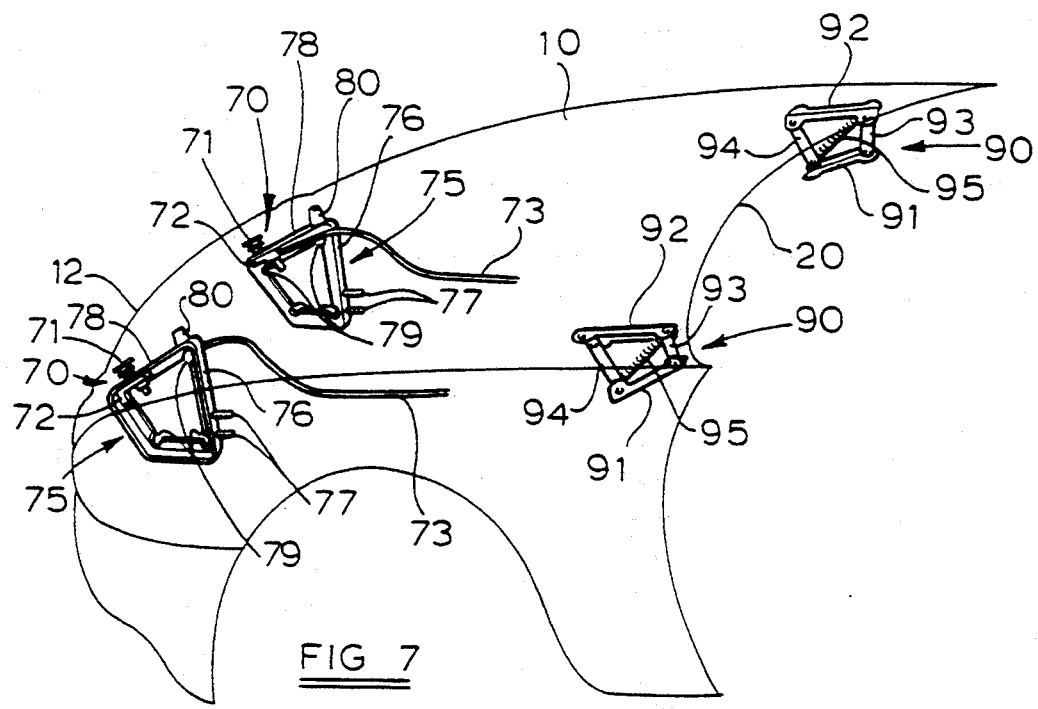
FIG. 7 shows a modification to the bonnet assembly illustrated in FIG. 6.

FIG. 7 shows a modification to the embodiment illustrated in FIG. 6, in which the hinges 85 are replaced by a four bar linkage mechanism 90. The linkage mechanism 90 comprises a first link 91 which is secured to the vehicle body and a second link 92 secured to the bonnet 10. Adjacent ends of links 91 and 92 are interconnected by link 93 which is pivotally connected at each end to one of the respective links 91 and 92, the other ends of links 91 and 92 are connected by link 94 which again is pivotally connected at each end to one of the respective links 91 and 92. A tension spring 95 acts between the pivotal connection of link 93 to link 92 and the pivotal connection between link 94 and link 91.

The links 91, 92, 93 and 94 are dimensioned and links 91 and 92 positioned such that upon normal opening of the bonnet; link 93 will pivot forwardly so that the pivot point between link 93 and link 92 moves downwards and forwards; while the pivot point between links 94 and 92 will at first move forwardly and then upwardly and rearwardly as links 92 and 93 rotate into straight alignment and then invert to form quadrilaterals which are re-entrant at the pivot between links 92 and 93. In this manner the leading edge 12 of the bonnet 10 is raised to permit access to the engine compartment. In the event of an accident, impact on the leading edge 12 of the bonnet 10 will cause the bonnet 10 to move rearwardly in the manner described above and the rearward movement of bonnet 10 will cause links 93 and 94 to pivot rearwardly lifting the trailing edge 20 of the bonnet 10. The springs 95 will absorb some of the energy of the impact. A pawl and ratchet or similar mechanism may be provided to prevent recoil of the links 93 and 94.

Various modifications may be made without departing from the invention. For example in the embodiment illustrated in FIG. 1, the links 16 and 17 may be replaced by a telescopic strut which will reduce in length upon impact with a pedestrian, causing the leading edge of the bonnet to move downwardly and rearwardly and the trailing edge to lift. The telescopic strut may include means to prevent shortening of the strut before a predetermined impact load is reached, and may also include damping means to cushion the initial impact.

We claim:

1. A vehicle bonnet assembly including a bonnet, the bonnet being hinged to the vehicle body by hinge means located adjacent its trailing edge, releasable latch means being provided adjacent the leading edge of the bonnet, said latch means being secured to the vehicle body by a structural member, the structural member being a quadrilateral frame member located longitudinally of the vehicle, the corners of the frame member being weakened in order to provide hinge points, so that the frame member will collapse longitudinally of the vehicle when a load is applied thereto due to an impact load applied to the leading edge of the bonnet, whereby collapsing of the frame member causing the bonnet to move rearwardly and the hinge means being arranged to lift the trailing edge of the bonnet upon rearward movement of the bonnet.

2. A bonnet assembly according to claim 1 in which the frame member is located longitudinally of the vehicle and is connected to the vehicle body by an upstanding side, the latch means being secured to the forward end of an upper side of the frame member, said upper side extending forwardly and downwardly from said upstanding side.

3. A bonnet assembly according to claim 2 in which a buffer is provided at the rearward end of the upper side of the frame member.

4. A bonnet assembly according to claim 1 in which the hinge means comprises a four bar linkage, a first link being secured to the vehicle body and a second link being secured to the bonnet, a third link pivotally connected at each end to adjacent rear ends of the first and second links and a fourth link pivotally connected at each end to the adjacent forward ends of the first and second links, the links being dimensioned and positioned so as to permit upward pivoting of the leading edge of the bonnet in normal operation and lifting of the trailing edge of the bonnet upon rearward movement of the bonnet when an impact is applied to its leading edge.

5. A bonnet assembly according to claim 4 in which a tension spring acts between the pivot connection of the third link to the second link and the pivotal connection of the fourth link to the first link.

* * * * *